Nov. 24, 1964 J. BRUNNER ETAL 3,158,756

MAGNETIC-FIELD RESPONSIVE ELECTRIC SWITCHING DEVICE

Filed Feb. 26, 1962 2 Sheets-Sheet 1

MAGNETIC-FIELD RESPONSIVE ELECTRIC SWITCHING DEVICE

Filed Feb. 26, 1962 2 Sheets-Sheet 2

United States Patent Office 3,158,756

Patented Nov. 24, 1964

3,158,756
MAGNETIC-FIELD RESPONSIVE ELECTRIC SWITCHING DEVICE

Julius Brunner and Friedrich Kuhrt, Nurnberg, and Erich Rainer, Erlangen, Germany, assignors to Siemens-Schuckertwerke Aktiengesellschaft, Berlin-Siemensstadt, Germany, a corporation of Germany Filed Feb. 26, 1962, Ser. No. 175,611
Claims priority, application Germany, Feb. 25, 1961, S 72,723
9 Claims. (Cl. 307—88.5)

Our invention relates to proximity switches, limit switches and other switching devices that electrically respond to the effect of a magnetic field. Devices of this type are applicable, for example, in various control and regulating systems for releasing or performing control operations in dependence upon the motion or position of a transmitter relative to a receiver.

Particularly well suitable for such purposes are switching devices whose magnetically responsive sensing element constitutes a Hall-voltage generator because the signal generation in such sensors depends only upon the effective magnetic induction rather than upon the change, or rate of change, of the induction. However, the output power available from Hall-voltage generators is relatively slight so that it has been necessary to employ a considerable amount of amplifying means for properly utilizing the magnetic-field responsive signal for the purpose of industrial control or switching operations.

It is an object of our invention to eliminate these shortcomings and to devise simple switching apparatus which afford controlling a semiconductor switching member, such as a silicon-controlled rectifier or other junction-type semiconductor device, by the output signal from a Hall-voltage generator, while requiring a considerably smaller amount of equipment and space than has been necessary for the amplifying accessories heretofore employed. Controllable semiconductor switching devices are now available for relatively high power ratings in the order of kilowatts, this being sufficient and satisfactory for most industrial applications of control and regulating equipment.

According to our invention, we provide the circuit to be controlled, hereinafter simply called "load circuit," with a suitable semiconductor switching device, preferably a device of the four-layer n-p-n-p type, and produce the ignition pulses for the gate electrode, also called "ignition electrode," "firing electrode," or "base," of the semiconductor switching member, by applying to that electrode the output voltage from the magnetic-field responsive Hall-voltage generator in series with a tunnel diode and in series with an auxiliary alternating-voltage source whose amplitude is matched to the characteristic of the tunnel-diode circuit so as to stay below the trigger condition of the tunnel diode.

As long as, in such a switching device, the Hall plate is not subjected to a magnetic field, the trigger value of the voltage across the tunnel diode is not exceeded so that no ignition pulse is produced and the load circuit remains open. However, as soon as a magnetic field causes the Hall plate to generate an appreciable Hall voltage, the resultant voltage across the tunnel diode exceeds the trigger value so that the current flowing through the tunnel diode abruptly drops from a high to a low value. As a result, an ignition pulse is issued to the gate circuit of the semi-conductor switching member which then is ignited to close the load circuit. By virtue of the invention, the problem of obtaining a highest possible power amplification as well as a correct matching of the Hall-voltage generator is thus solved in a particularly simple and reliable manner.

According to another feature of our invention, it is in many cases preferable to provide the switching device with a pulse transformer which serves to galvanically separate or isolate the tunnel diode from the semiconductor switching member and which, if desired, may also serve to transform the pulse voltage.

According to still another feature of the invention, the above-mentioned auxiliary alternating voltage and the normal energizing or control current for the Hall plate of the Hall-voltage generator are preferably taken from a transformer connected to the same alternating-current supply line as the load circuit and the semiconductor switch member, so that a particularly simple current supply is secured. It is also of advantage in some cases to provide for phase displacement between the auxiliary voltage and the line voltage in order to obtain a complete control throughout the period of a half-wave.

The above-mentioned and further objects, advantages and features of our invention, said features being set forth with particularity in the claims annexed hereto, will be apparent from, and will be described in, the following with reference to the embodiments of switching devices according to our invention illustrated by way of example in the accompanying drawings, in which:

Figure 1:
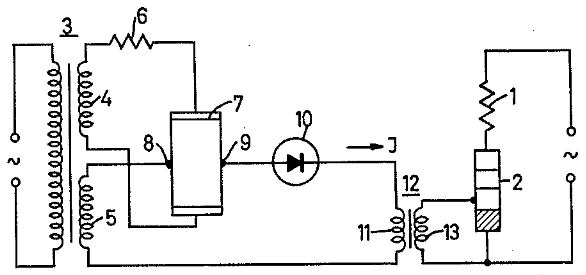
FIG. 1 is a circuit diagram of a first embodiment, of the switching device of the present invention

According to FIG. 1, a load 1, for example the winding of a control contactor, is connected to an alternating-current supply line through a semiconductor switching member 2 schematically shown to be of the four-layer or p-n-p-n junction type. The switching device 2 may consist of a silicon-controlled rectifier, for example. It has its two main electrodes connected in series with the load across the current-supply leads so that the load is substantially switched off as long as the semiconductor device is non-conductive. Connected to the same current-supply line, if desired through a phase shifter of conventional type (not illustrated), is a transformer 3 with two secondary windings 4 and 5. The secondary winding 4 is connected through a resistor 6 with the current terminals of a semiconductor Hall plate 7 consisting for example of indium antimonide (InSb) or indium arsenide (InAs). The secondary winding 4 thus furnishes the energizing or control current for the Hall plate. The Hall voltage $U_H$ appearing across the two Hall electrodes 8 and 9 of the Hall plate is connected in series with the auxiliary voltage $U_O$ from secondary winding 5 to a tunnel diode 10 in series with the primary winding 11 of a pulse transformer 12 whose secondary winding 13 is connected to the control, gate, or ignition electrode of the semiconductor switching member 2.

Figure 9:
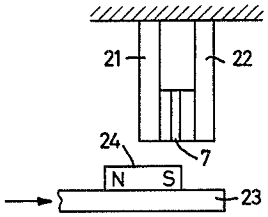
FIG. 9 is a schematic representation of the Hall-generator portion of the switching device of the invention in relation to a travelling permanent magnet to serve as a proximity or limit switch.

For describing the operation of the device, reference will first be had to the schematic illustration in FIG. 9. As shown, the Hall plate 7 is mounted between two pole pieces 21 and 22 of soft-magnetic material such as highly permeable ferrite. The assembly, in the example shown, is mounted at a fixed location. During the operation to be controlled, a machine structure 23 travels along the Hall-generator assembly and carries a permanent magnet 24. As long as the magnet 24 is remote from the sensing assembly, the Hall voltage between electrodes 8 and 9 (FIG. 1) is substantially zero, but when the magnet 24 approaches the sensing assembly, the Hall voltage assumes a steeply increasing value. This Hall voltage, in additive relation to the auxiliary alternating voltage from the secondary winding 5 of transformer 3, imposes upon the tunnel diode 10 a triggering effect which may be understood from the current-voltage characteristic of the tunnel-diode circuit schematically shown in FIG. 2.

Figure 2:
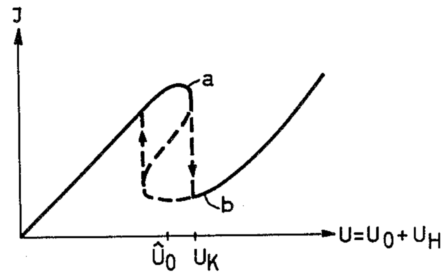
FIGS. 2 and 3 are explanatory graphs relating thereto.

The abscissa in FIG. 2 indicates the electro-motive force in the tunnel-diode circuit which is equal to the sum of Hall voltage $U_H$ and auxiliary alternating voltage $U_O$. The peak value $\hat{U}_O$ of the auxiliary voltage is dimensioned to stay below the critical voltage $U_K$ at which the current-voltage characteristic of the tunnel-diode circuit reaches its trigger point *a*. Consequently, only when a controlling magnetic field is active upon the Hall-voltage generator and a finite value of the Hall voltage $U_H$ appears, can the sum of the two voltages in the pulse-generating circuit exceed the critical value $U_K$ at the trigger point *a* of the tunnel-diode characteristic.

Figure 3:
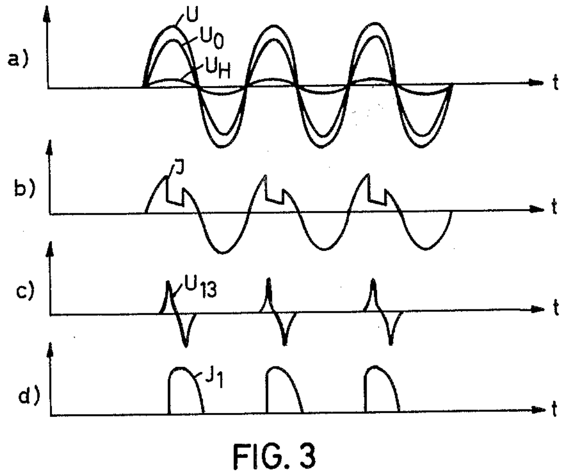

FIG. 3 shows schematically the time curves of different electric magnitudes of the embodiment of FIG. 1. FIG. 3*a* indicates the Hall voltage $U_H$ versus time *t*, also the time curves of the auxiliary voltage $U_O$ and of the sum voltage U. Due to the fact that the control current of the Hall generator is taken from the alternating-current line, the Hall voltage $U_H$ is sinusoidal in accordance with the sine wave of the line current.

FIG. 3*b* represents the current J flowing through the tunnel diode. FIG. 3*c* represents the ignition-voltage pulses $U_{13}$ induced in the secondary winding 13 of the transformer 12. FIG. 3*d* indicates the load current $J_1$ flowing through the load 1.

When the voltage $U_O$ is in phase with the alternating current of the supply line, the ignition of the semiconductor switching member 2 can take place only in the range of the line-voltage peak value because the trigger point *a* on the characteristic in FIG. 2 must be exceeded. However, the above-mentioned phase displacement between the auxiliary alternating voltage and the line voltage affords supplying the load with complete half-waves of the line voltage.

Figure 4:
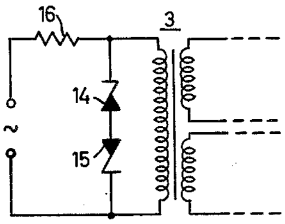
FIG. 4 is a circuit diagram of a modified portion of a switching device otherwise corresponding to the embodiment of FIG. 1.

Another way of securing the same result is to enforce an approximately rectangular output voltage of transformer 3 by suitable choice of the transformation ratio and by provision of voltage limitation. This can be done, as shown in FIG. 4, by means of two Zener diodes 14 and 15 which are poled in mutually opposed directions and are connected in series across the primary winding of the transformer 3, the excessive voltage being impressed upon a resistor 16. Such a modification has the additional effect of stabilizing the trigger point of the tunnel diode relative to line-voltage fluctuations.

Relative to the application of the switching device according to the invention in practice, there are different possibilities which, in general, are determined by the particularities of the available current supply. For example, the load circuit with the semiconductor switching member may be connected to a direct-current line and in this case is to be provided with an extinction circuit as generally known for such purposes. As a rule, however, it is preferable to operate the device only from an alternating-current supply. While a single-phase load circuit is shown in FIG. 1, plural-phase load circuits with a corresponding number of silicon-controlled rectifiers or other semiconductor switching devices may be controlled according to the invention by correspondingly providing a plural-phase transformer 3 and a corresponding plurality of pulse circuits whose respective pulse transformers are connected to the control electrodes of the semiconductor devices in the respective phase branches of the load circuit.

In a magnetically-responsive switching device according to the invention, the control current for energizing the Hall plate 7 may also consist of direct current or rectified current. In this case, the Hall voltage generated in response to a magnetic field is a unidirectional voltage whose polarity depends upon the polarity of the magnetic field acting upon the plate. When energizing the Hall plate by alternating current, a change in polarity of the magnetic field manifests itself in a phase reversal of the Hall voltage. In all of these cases, however, a device according to the invention as described so far is not intended to respond in dependence upon field polarity and is not capable of such performance. The triggering of the load circuit will rather occur whenever the magnetic field reaches a sufficient intensity at the Hall plate, and then takes place during each second half-wave of the alternating line voltage, the operation of the load being the same regardless of whether triggering occurs in one or the other half-wave period.

According to another object of our invention, however, a switching device embodying the above-described principle is also designed to discriminate between the directions of the exciting magnetic field. To this end, and in accordance with another feature of our invention, we impress the Hall voltage upon two pulse-generating circuits of which each is equipped with a tunnel diode and connected to a source of auxiliary alternating voltage so that, depending upon the polarity of the exciting magnetic field, the Hall voltage and the auxiliary voltage are in phase in one of these two circuits but of mutually opposed phase in the other circuit.

In order to impose upon the Hall voltage only the load of the one circuit that is active at a time, it is preferable according to still another feature of our invention to connect normal diodes poled in the same forward direction in series with the respective tunnel diodes.

According to a further feature, the ignition pulses produced in such a modified device are employed for controlling two anti-parallel connected semiconductor switching members to operate as a three-point switch.

Figure 5:
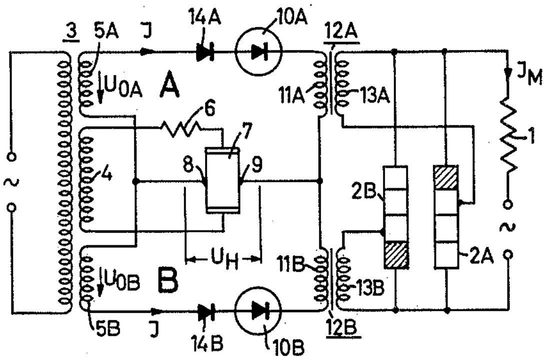
FIG. 5 is a circuit diagram of another embodiment of the switching device of the present invention.

The embodiment shown in FIG. 5 incorporates the above-described improvement features. This switching circuit is to a large extent similar to the embodiment of FIG. 1, the same reference numerals being applied to the same respective circuit components as in FIG. 1. The load 1 according to FIG. 5, which may consist of any device or component to be controlled, is connected to an alternating-current supply line through two anti-parallel connected semiconductor switching devices 2A and 2B such as silicon-controlled rectifiers. Connected to the same alternating-current line, if necessary through a phase-shifter (not illustrated), is a transformer 3 with three secondary windings 4, 5A and 5B. The secondary winding 4 furnishes alternating control current for the Hall plate 7 through a series resistor 6. The Hall voltage $U_H$, appearing between the Hall electrodes 8 and 9 of the plate 7, constitutes a voltage source in two ignition-pulse generating circuits of which one comprises in series the secondary winding 5A, serving as a second voltage source, a tunnel diode 10A and the primary winding 11A of a pulse transformer 12A. The second pulse-generating circuit comprises, in series with the Hall voltage, the alternating auxiliary voltage from the secondary winding 5B and a tunnel diode 10B as well as the primary winding 11B of a pulse transformer 12B. The two secondary windings 5A and 5B impress auxiliary alternating voltages $U_{OA}$ and $U_{OB}$ upon the respective circuits in the mutual phase relation according to the instantaneous current-flow directions indicated by respective arrows in FIG. 5.

The secondary windings 13A and 13B of the two pulse transformers are connected in the respective ignition circuits of the semiconductor switching devices 2A and 2B. Connected in series with the respective tunnel diodes 10A and 10B are normal diodes 14A and 14B, each poled in the same forward direction as the tunnel diode in the same circuit.

The performance of each tunnel diode is as described above with reference to FIG. 2. That is, with increasing voltage U in the tunnel-diode circuit, this voltage being the sum of the Hall voltage $U_H$ and the alternating auxiliary voltage $U_O$, the current J first increases. When the sum voltage does not reach the critical value $U_K$, the trigger point *a* on the current-voltage characteristic of the tunnel-diode circuit is not attained, so that no ignition pulses are issued to the semiconductor switching devices. The amplitude $\hat{U}_O$ of the alternating voltage is so rated that it remains below the critical voltage $U_K$. However, when a Hall voltage of such direction occurs that it is in phase with the auxiliary voltage, the trigger point *a* of the tunnel-diode characteristic is exceeded in each second half-wave of the line voltage and a corresponding ignition pulse is generated.

In which particular tunnel-diode circuit the ignition pulses are thus produced, depends upon the direction of the exciting magnetic field and hence upon the direction of the Hall voltage $U_H$. Consequently, in the load 1 a median current value $J_M$ is obtained according to the current-voltage diagram in FIG. 6. In a given range of the Hall voltage, the load current is equal to zero and, as soon as the Hall voltage is sufficient for reaching or exceeding the trigger point *a*, the current jumps to the value determined by the load-circuit impedance.

Figure 7:
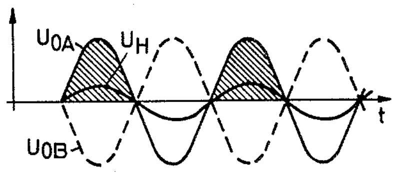
Figure 8:
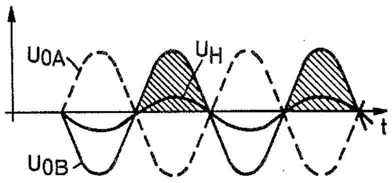

As shown by FIGS. 7 and 8 in conjunction with FIG. 2, the ignition pulses can be produced only when the Hall voltage and the auxiliary alternating voltage in the particular tunnel-diode circuit are in phase with each other. This is satisfied in the diagram of FIG. 7 for the auxiliary voltage $U_{OA}$, whereas the Hall voltage $U_H$ is in counterphase with respect to the auixilary alternating voltage $U_{OB}$ (shown by a broken-line curve). Consequently, in each of the hatched half-waves, the semiconductor device 2A is turned on. In the diagram according to FIG. 8 the conditions are reversed. The auxiliary voltage $U_{OB}$ and the Hall voltage $U_H$ are in phase, so that during the hatched halfwaves the semi-conductor switching device 2B is turned on.

It will be understood that in this manner a polarity reversal of the rectified current in the load 1 occurs, so that the polarity of the load voltage or the direction of the current flow in the load circuit is indicative of the magnetic field polarity. If desired, corresponding load members may be connected in the branch circuits of the two semiconductor devices 2A and 2B, respectively, so that only one of these two devices responds, in discriminating response to the polarity of the magnetic field being sensed.

Figure 6:
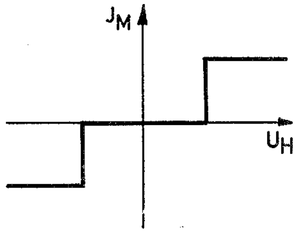
FIGS. 6, 7 and 8 are explanatory graphs relating thereto.

The time point and the width of the intensity range according to FIG. 6, that is, the range in which the load current is substantially zero, can be controlled and adjusted by correspondingly adjusting the amplitude of the alternating auxiliary voltage, and/or the alternating control current passing through the Hall plate 7 from the secondary winding 4, and/or by adjusting the phase position of the feeder voltage supplied to the transformer 3.

As in the embodiment of FIG. 1, the load circuit of the embodiment of FIG. 5 can be modified by energizing it from a direct-current supply. In this case, it is necessary to provide for extinction of the semiconductor switching devices by providing them with the conventional extinction circuits, for example equipped with capacitors which, when charged, discharge through the semiconductor switching device and momentarily impose thereupon a voltage which cancels the line voltage, thus causing the device to become non-conductive. The control current for the Hall-voltage generator, as well as the auxiliary alternating voltage, may then be supplied from a rectangular-wave oscillator, preferably of a high keying frequency in the order of kilocycles per second.

Direction or polarity discriminating devices of this kind, aside from furnishing a very high gain in polar amplification from signals of minute intensity, are applicable for various purposes for performing respectively different control, regulating or indicating operations in response to the direction or change in direction of a magnetic field.

To those skilled in the art, it will be obvious upon study of this disclosure that our invention permits of a great variety of modifications with respect to components and circuitry, and hence can be given embodiments other than particularly illustrated and described herein, without departing from the essential features of our invention and within the scope of the claims annexed hereto.

We claim:

1. A magnetic-field responsive electric switching device, comprising a Hall plate having an energizing circuit and having a Hall electrode circuit for providing a magnetic-field responsive Hall voltage; auxiliary alternating-voltage supply means; and a tunnel diode connected to produce an output pulse and disposed in said Hall electrode circuit in series with said voltage supply means, said voltage supply means having a voltage amplitude below the trigger voltage of said tunnel diode whereby an output pulse is produced when the sum of said Hall voltage and auxiliary voltage exceeds a value corresponding to said trigger voltage.

2. A magnetic-field responsive electric switching device, comprising a Hall plate having an energizing circuit and having a Hall electrode circuit for providing a magnetic-field responsive Hall voltage; alternating-voltage supply means for providing an auxiliary voltage; and a tunnel diode connected in said Hall-electrode circuit in series with said voltage supply means, said auxiliary voltage having an amplitude below the trigger voltage of said tunnel diode whereby an output pulse is produced when the sum of said Hall voltage and auxiliary voltage exceeds a value corresponding to said trigger voltage.

3. A magnetic-field responsive electric switching device, comprising a Hall plate having an energizing circuit and having a Hall electrode circuit for providing a magnetic-field responsive Hall voltage; alternating-voltage supply means for providing an auxiliary voltage; a tunnel diode connected in said Hall electrode circuit in series with said voltage supply means, said auxiliary voltage having an amplitude below the trigger voltage of said tunnel diode; and a transformer connected to said Hall electrode circuit for supplying to an output pulse when the sum of said Hall voltage and auxiliary voltage exceeds a value corresponding to said trigger voltage.

4. A magnetic-field responsive electric switching device, comprising alternating-current supply leads; a transformer connected to said leads, said transformer having a secondary winding for providing auxiliary voltage; a Hall plate having current supply terminals connected to said transformer to be energized therefrom and having a Hall electrode circuit for providing a magnetic field responsive Hall voltage; a tunnel diode connected in said Hall electrode circuit in series with the secondary winding of said transformer, the auxiliary voltage provided by said transformer having an amplitude below the trigger voltage of said tunnel diode; whereby an output pulse is produced when the sum of said Hall voltage and auxiliary voltage at said tunnel diode exceeds said trigger voltage.

5. In a magnetic-field responsive switching device according to claim 4, said auxiliary voltage of said secondary winding having a leading phase angle of about 90° relative to the voltage of said supply leads.

6. In a magnetic-field responsive switching device according to claim 4, said transformer having a primary winding connected between said supply leads, and two Zener diodes connected in series with each other across said primary winding and having mutually opposed poling for imparting to the transformer output voltages an approximately rectangular wave shape.

7. A magnetic-field responsive electric switching device, comprising a Hall plate having an energizing circuit and having a Hall electrode circuit for providing a magnetic-field responsive Hall voltage; alternating-voltage supply means for providing a pair of auxiliary voltages; a pair of tunnel diodes connected in said Hall electrode circuit in series with each of the auxiliary voltages of said voltage supply means, said auxiliary voltages having an amplitude lower than the trigger voltages of said tunnel diodes; and output means connected to each of said tunnel diodes, the Hall voltage and auxiliary voltage having the same phase in one of said output means and opposed phase in the other of said output means depending upon the polarity of the magnetic field at said Hall plate whereby a selected one of said output means receives an output pulse when the sum of the Hall voltage and corresponding auxiliary voltage exceeds a value corresponding to said tunnel-diode trigger voltage.

8. A magnetic-field responsive electric switching device according to claim 7, comprising two normal diodes connected in series with said respective tunnel diodes and having the same poling as the corresponding tunnel diodes.

9. A magnetic-field responsive electric switching device, comprising alternating-current supply leads; a transformer having a primary winding connected to said leads and having three secondary windings; a Hall plate for sensing a magnetic field having terminals connected to one of said secondary windings to receive energizing current therefrom, said Hall plate having Hall electrodes for providing magnetic field responsive Hall voltage; two pulse transformers; two control circuits each comprising a tunnel diode connected to said Hall electrodes in series with one of the two other secondary windings to receive auxiliary voltage therefrom, said auxiliary voltage having an amplitude smaller than the trigger voltage of the corresponding tunnel diode; and output means connected to each of said control circuits, the Hall voltage and auxiliary voltage having the same phase in one of said output means and opposed phase in the other of said output means depending upon the polarity of the magnetic field at said Hall plate whereby a selected one of said output means receives an output pulse when the sum of the Hall voltage and the corresponding auxiliary voltage exceeds a value corresponding to said tunnel-diode trigger voltage.

References Cited by the Examiner

UNITED STATES PATENTS

| | | | |
|---|---|---|---|
| 2,920,240 | 1/60 | Macklem | 315—205 X |
| 3,070,739 | 12/62 | Hansen et al. | 307—88.5 X |

JOHN W. HUCKERT, *Primary Examiner.*

ARTHUR GAUSS, *Examiner.*